(12) United States Patent
Kondo (10) Patent No.: US 12,200,182 B2
(45) Date of Patent: Jan. 14, 2025

(54) DISPLAY DEVICE AND DISPLAY METHOD

(71) Applicant: Naruya Kondo, Ibaraki (JP)

(72) Inventor: Naruya Kondo, Ibaraki (JP)

( * ) Notice: Subject to any disclaimer, the term of this patent is extended or adjusted under 35 U.S.C. 154(b) by 165 days.

(21) Appl. No.: 17/868,304

(22) Filed: Jul. 19, 2022

(65) Prior Publication Data

US 2023/0023455 A1 Jan. 26, 2023

(30) Foreign Application Priority Data

Jul. 21, 2021 (JP) .................................. 2021-120236

(51) Int. Cl.
*H04N 13/117* (2018.01)
*H04N 13/167* (2018.01)

(52) U.S. Cl.
CPC ......... *H04N 13/117* (2018.05); *H04N 13/167* (2018.05)

(58) Field of Classification Search
None
See application file for complete search history.

(56) References Cited

U.S. PATENT DOCUMENTS

2020/0404218 A1* 12/2020 Yerli .................. G06Q 30/0643
2022/0383586 A1* 12/2022 Onuma .................. G06F 3/017

FOREIGN PATENT DOCUMENTS

| JP | 2016197302 A | 11/2016 |
| JP | 2017130008 A | 7/2017 |
| JP | 2019017755 A | 2/2019 |

OTHER PUBLICATIONS

Kouichi Watanabe, "Telexistence into Cyberspace using an Immersive Auto-Stereoscopic Display", Journal, 2012, 91-100, vol. 17, No. 2, The Virtual Reality Society of Japan.

* cited by examiner

*Primary Examiner* — Xiaolan Xu (74) *Attorney, Agent, or Firm* — Hayes Soloway PC (57) ABSTRACT

In accordance with an embodiment, a display device includes a display unit performing a control for displaying a display image related to a predetermined object as a two-dimensional image in a virtual space; and a parameter acquisition unit acquiring a first parameter related to a viewpoint in the virtual space and a second parameter defining a change in the predetermined object, wherein the display unit changes an inclination of the two-dimensional image in the virtual space based on the first parameter and performs the control for displaying the display image related to the predetermined object based on the first parameter and the second parameter.

3 Claims, 7 Drawing Sheets

DISPLAY DEVICE AND DISPLAY METHOD

CROSS-REFERENCE TO RELATED APPLICATION

This application claims the benefit of Japanese patent application JP2021-120236, filed on Jul. 21, 2021, the contents of which are incorporated herein by reference.

TECHNICAL FIELD

The present disclosure relates to a display device and a display method.

BACKGROUND

In recent years, the technology (hereinafter referred to as photogrammetry technology) of generating 3D objects (hereinafter referred to as objects) generated on the basis of 2D images of real world things imaged from various angles is known. In addition, in photogrammetry technology, a technology for determining the size of a 3D object based on the relative distance between two or more imaging points that capture 2D images has been proposed (e.g., patent document 1).

SUMMARY

The technology described above is for generating static 3D objects, but there is also a need to generate dynamic 3D objects.

However, when a dynamic 3D object is generated, it is necessary to define the physical laws of movement of each part of the 3D object, and an extremely specialized knowledge is required for generating dynamic 3D objects. In addition, the computational costs required for the generation and use of dynamic 3D objects are also enormous.

The present disclosure has been made to solve the above-mentioned problems, and the purpose thereof is to provide a display device and a display method capable of artificially representing a 3D object by a simple method.

The main point of the first feature is a display device including: a display unit performing a control for displaying a display image related to a predetermined object as a two-dimensional image in a virtual space; and a parameter acquisition unit acquiring a first parameter related to a viewpoint in the virtual space and a second parameter defining a change in the predetermined object, wherein the display unit changes an inclination of the two-dimensional image in the virtual space based on the first parameter and performs the control for displaying the display image related to the predetermined object based on the first parameter and the second parameter.

The main point of the second feature is to include, in the first feature, an image acquisition unit acquiring an imaged image that is imaged from two or more angles and including a change in the predetermined object, and a model generation unit generating an image generation model by learning angles and the imaged image, wherein the display unit generates the display image related to the predetermined object by using the image generation model.

The main point of the third feature is that, in the first feature or the second feature, the parameter acquisition unit acquires a result of optically recognizing the predetermined object in real time as the second parameter.

The main point of the fourth feature is that, in the first feature or the second feature, the parameter acquisition unit acquires a command specifying an operation to the predetermined object as the second parameter.

The main point of the fifth feature is that, in the first feature or the second feature, the parameter acquisition unit acquires a command specifying at least any one of time and environment defining the change of the predetermined object as the second parameter.

The main point of the sixth feature is a display method including: a step A of performing a control for displaying a display image related to a predetermined object as a two-dimensional image in a virtual space; and a step B of acquiring a first parameter related to a viewpoint in the virtual space and a second parameter defining a change in the predetermined object, wherein in the step A, an inclination of the two-dimensional image in the virtual space is changed based on the first parameter, and the control for displaying the display image related to the predetermined object is performed based on the first parameter and the second parameter.

According to the present disclosure, it is possible to provide a display device and a display method capable of artificially representing a 3D object by a simple method.

DETAILED DESCRIPTION OF THE DRAWINGS

Hereinafter, some of the embodiments will be described with reference to the drawings. In the description of the following drawings, identical or similar portions are marked with the same or similar signs. However, the drawings are schematic.

Figure 1:
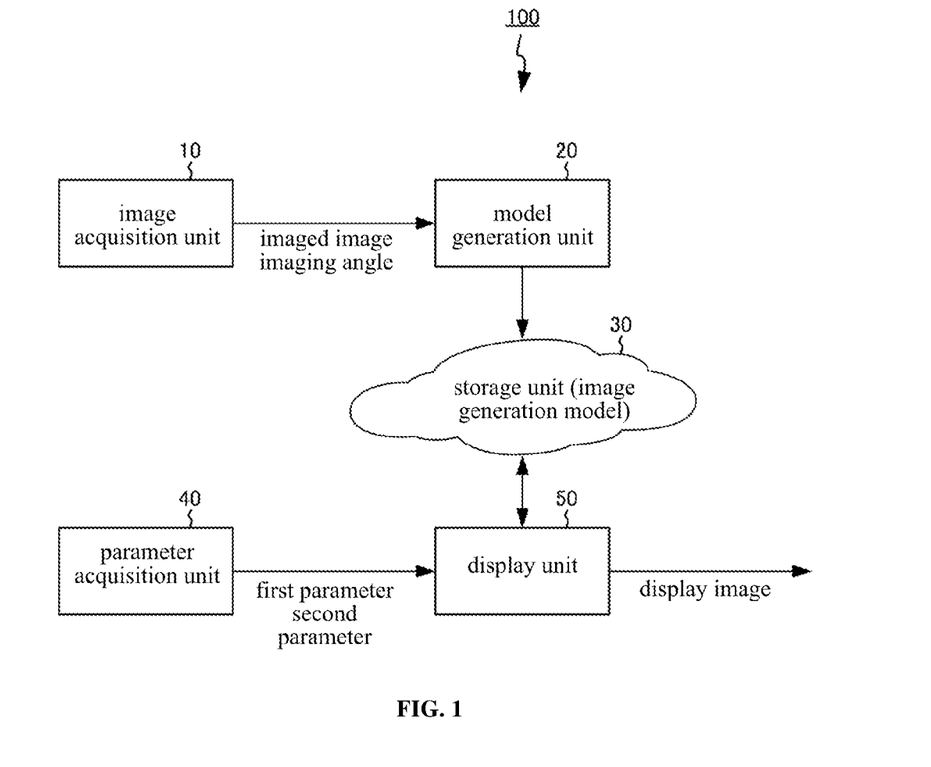
FIG. 1 is a diagram showing a display device 100 according to an embodiment.

A display device according to an embodiment is described below. FIG. 1 is a diagram showing a display device 100 according to an embodiment.

As shown in FIG. 1, the display device 100 includes an image acquisition unit 10, a model generation unit 20, a storage unit 30, a parameter acquisition unit 40, and a display unit 50. As described later, the display device 100 performs control for displaying a display image related to a predetermined object as a two-dimensional image (hereinafter, referred to as a Billboard).

The image acquisition unit 10 acquires an imaged image that is imaged from two or more angles and includes a change in the predetermined object. The imaged image may be a moving image (video), or two or more static images. The image acquisition unit 10 may include an imaging device (such as a camera) for imaging a predetermined object, and may acquire the imaged image from the imaging device.

The predetermined object may include, without particular limitation, an object (hereinafter, referred to as a first object) that is operated autonomously or automatically. For example, the first object may include at least a portion of a human being (for example, a face), and may include a pet such as a dog or a cat.

The predetermined object may include an object (hereinafter, referred to as a second object) that is operated heteronomously or passively. For example, the second object may include foods such as buckwheat and pasta, may include clothing such as clothes, hats, footwear, and gloves, and may include small items such as bags and wallets.

The model generation unit 20 generates an image generation model by learning angles (imaging angles) and the imaged image of the predetermined object. The imaging angles may be read as an imaging viewpoint. The learning may be machine learning or deep learning. The learning may include AI (Artificial Intelligence). Here, the imaged image includes a change form of the predetermined object. The model generation unit 20 generates an image generation model capable of outputting a display image expressing the change form of the predetermined object from various angles by learning the imaging angles and the change form.

The model generation unit 20 may use data input by a known feature point extraction algorithm to generate the image generation model, but is not particularly limited. The model generation unit 20 may use data input by a known motion capture technology to generate the image generation model.

The storage unit 30 stores the image generation model generated by the model generation unit 20.

The parameter acquisition unit 40 acquires a first parameter related to a viewpoint (hereinafter, referred to as a virtual space viewpoint) in a virtual space and a second parameter defining a change in the predetermined object.

The first parameter is a parameter defining an orientation (viewpoint) in which the predetermined object is visually recognized in the virtual space. In the embodiment, the first parameter may be considered to be a parameter defining the inclination of the Billboard in the virtual space.

The second parameter is a parameter defining a dynamic change of the predetermined object. The second parameter may be a result of optically recognizing the predetermined object in real time. For example, the optically recognized result may include an imaging result of the predetermined object using an imaging device such a camera, or may be a detection result of the predetermined object using LiDAR (Light Detection and Ranging). The second parameter may be a command specifying an operation to the predetermined object. For example, the command may be a command that specifies an operation of lifting noodles such as buckwheat or pasta. The second parameter may be a command that specifies at least any one of time and environment defining a change in the predetermined object. For example, the command may be a command that specifies a time lapse, or may be a command that specifies an environmental change such as temperature or humidity. Such command may be input first and may not be input sequentially.

The display unit 50 performs control for displaying a display image related to the predetermined object as a Billboard in the virtual space. The display unit 50 changes the inclination of the Billboard in the virtual space based on the first parameter, and performs control for displaying the display image related to the predetermined object based on the first parameter defining the inclination of the Billboard and the second parameter defining the dynamic change of the predetermined object. Specifically, the display unit 50 changes the angle of the predetermined object on the Billboard based on the first parameter, and generates the display image related to the predetermined object viewed from the changed angle by inputting the second parameter into the predetermined model.

Figure 2A:
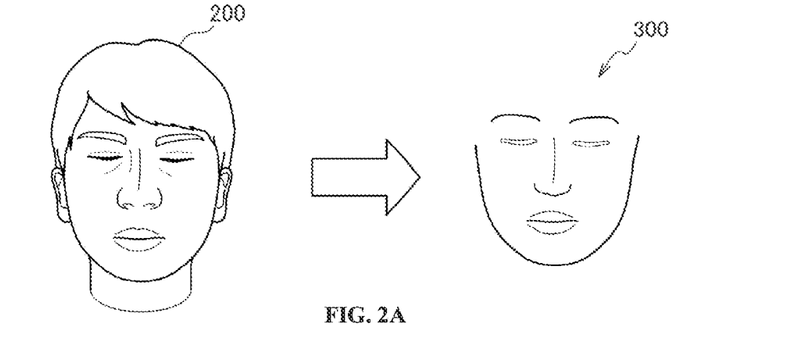
FIGS. 2A-2C is a diagram for explaining learning related to an embodiment.
Figure 2B:
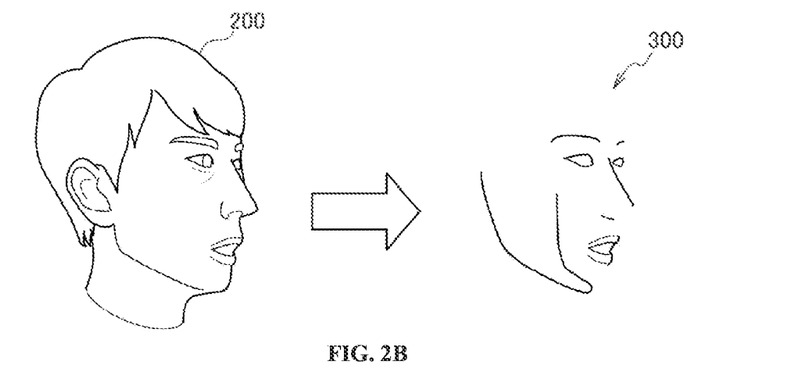
Figure 2C:
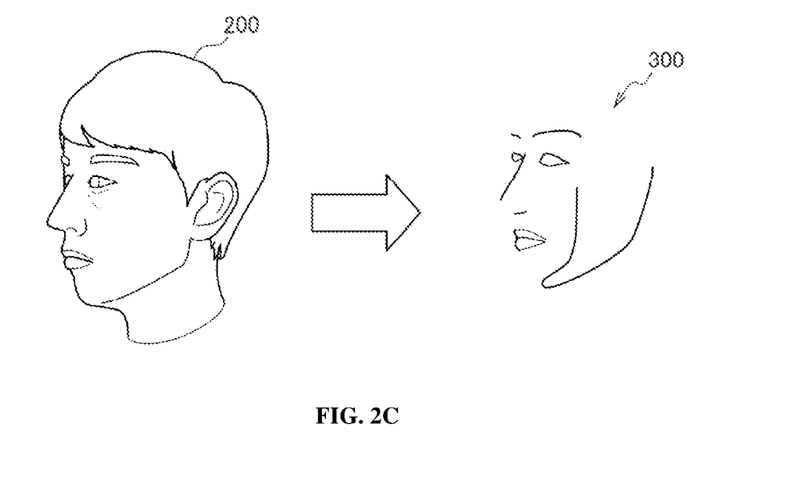

An example of learning (generation of the image generation model) is explained below. FIGS. 2A-2C are a diagram for explaining learning related to an embodiment;

Here, a case where the predetermined object is a human face is exemplified. The change of the predetermined object may be a change in facial expression.

As shown in FIGS. 2A-2C, the display device 100 acquires an imaged image that is imaged from two or more angles and includes a change in the predetermined object 200. For example, the imaged image may include an image of the face imaged from the front, an image of the face imaged from the right side, an image of the face imaged from the left side, and the like. The imaged image may include an image with closed eyes, an image with open eyes, an image with a closed mouth, an image with an open mouth, and the like.

The display device 100 extracts a face feature point 300 from each imaged image. A known algorithm can be used as an algorithm for extracting a facial feature point 300.

The display device generates the image generation model by learning the imaged images of the predetermined object 200, the angles (front, right side, left side, etc.) and the feature points 300.

Here, a case, where the image generation model is generated using data input by the known feature point extraction algorithms, is shown, but the image generation model may also be generated using data input by a known motion capture technology. However, the generation method of the image generation model is not particularly limited. It is satisfied if the image generation model is a model that generates faces with various expressions from various angles.

Figure 3:
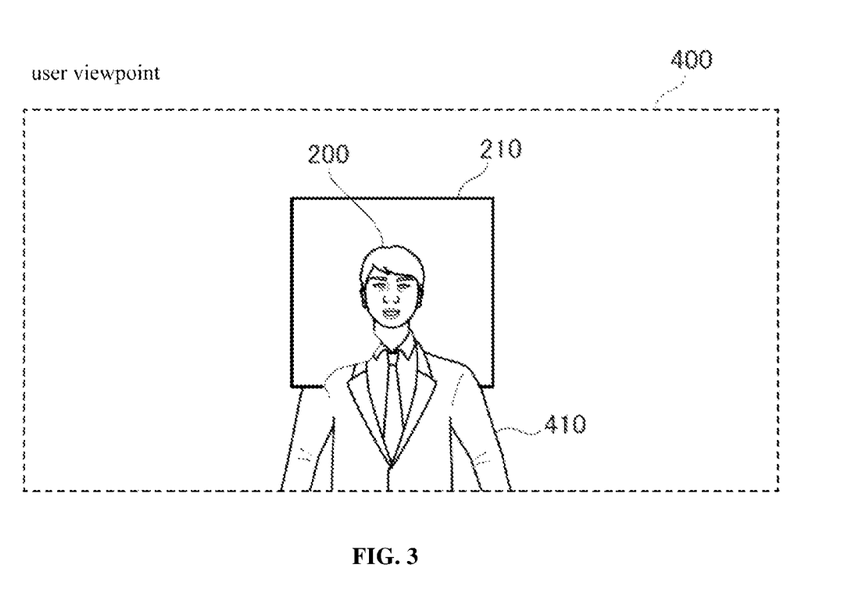
FIG. 3 is a diagram for explaining display related to an embodiment.
Figure 4:
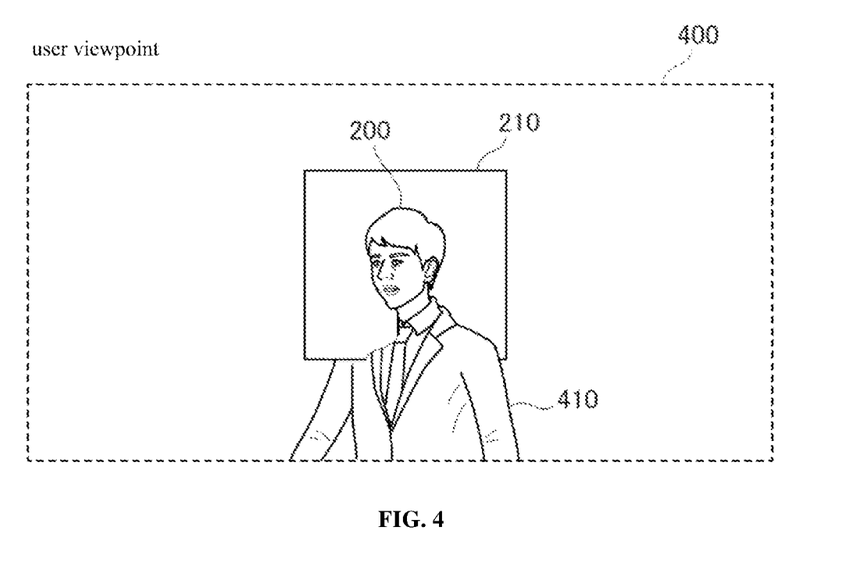
FIG. 4 is a diagram for explaining display related to an embodiment.
Figure 5:
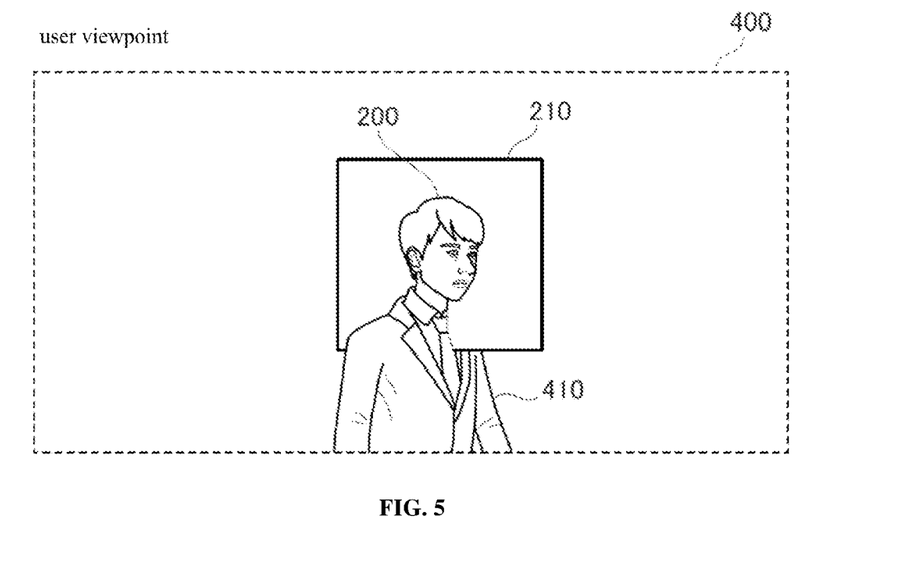
FIG. 5 is a diagram for explaining display related to an embodiment.

An example of the display (output of display images) is explained below. FIGS. 3-5 are diagrams for explaining the display related to the embodiments.

Here, the predetermined object is a human face in the real world, and a case where a human face is superimposed on a human body in a virtual space is exemplified. The human body may be a 3D image generated by CG (Computer Graphics) technology in advance. The human body may be considered to be a part of the virtual space. A case where the second parameter is an imaged image of the predetermined object is exemplified.

In addition, in order to clarify the explanation, a viewpoint in which a user using the display device 100 visually recognizes the predetermined object in the virtual space will be described as an example (user viewpoint). The user viewpoint may be considered to be one of the virtual space viewpoints. The virtual space viewpoint may be considered to be a viewpoint in which an image in a virtual space is visually recognized in absolute coordinate axes that define the virtual space.

In such a case, from the user viewpoint, the inclination of the Billboard may be changed so that the Billboard is directly opposed to the user viewpoint. That is, the inclination of the Billboard is changed based on the first parameter related to the user viewpoint (one of the virtual space viewpoints). On the other hand, in a virtual space viewpoint different from the user viewpoint, the inclination of the Billboard may be changed based on the relative difference between the user viewpoint and the virtual space viewpoint. That is, the inclination of the Billboard is changed based on the first parameter related to the virtual space viewpoint. The inclination of the Billboard may include an inclination centered on the vertical axis, may include an inclination centered on the horizontal axis, or may include an inclination centered on the depth axis.

Under such an assumption, as shown in FIGS. 3-7, the display device 100 superposes the Billboard 210 of the predetermined object 200 on the body 410 in the virtual space 400 in the image of the user viewpoint. The predetermined object 200 on the Billboard 210 may be an imaged image itself of the predetermined object 200.

Hereinafter, a case, where the orientation in which the predetermined object 200 is imaged (hereinafter, referred to as an imaging viewpoint) is a viewpoint defined by assuming that a human face in the real world is imaged from the front, is exemplified. For example, in the imaged image, the predetermined object 200 may be a front view of a human face in the real world. However, in the imaged image, an image in which a human face in the real world is swung vertically and horizontally may be imaged. In such a case, an image in which a human face is swung vertically and horizontally in a virtual space may be displayed. In the following example, it is assumed that the inclination of the Billboard is changed to be in direct opposition to the user viewpoint based on the first parameter related to the user viewpoint.

First, a case, where the user viewpoint is the same as the imaging viewpoint of the predetermined object 200 and the virtual space viewpoint is the user viewpoint, will be described. As shown in FIG. 3, the user viewpoint may be a viewpoint in which the body 410 is visually recognized from the front. Since the virtual space viewpoint is the user viewpoint, the inclination of the Billboard 210 is changed so that the Billboard 210 is directly opposed to the user viewpoint. On the Billboard 210, a display image related to the predetermined object 200 is generated based on the first parameter and the second parameter (the imaged image) related to the user viewpoint (the virtual space viewpoint). In such a case, since the user viewpoint is the same as the imaging viewpoint of the predetermined object 200, the display device 100 may perform the control for displaying the imaged image of the predetermined object 200 as the imaged image is as the display image related to the predetermined object 200.

Second, a case, where the user viewpoint is different from the imaging viewpoint of the predetermined object 200 and the virtual space viewpoint is the user viewpoint, will be described. As shown in FIG. 4, the user viewpoint may be a viewpoint in which the body 410 is visually recognized from the left side by approximately 30°. Since the virtual space viewpoint is the user viewpoint, the inclination of the Billboard 210 is changed so that the Billboard 210 is directly opposed to the user viewpoint. On the Billboard 210, a display image related to the predetermined object 200 is generated based on the first parameter and the second parameter (the imaged image) related to the user viewpoint (the virtual space viewpoint). In such a case, since the user viewpoint is different from the imaging viewpoint of the predetermined object 200, the display device 100 may generate an image oriented to be visually recognized from the user viewpoint (approximately 30° from the left side) based on the imaged image of the predetermined object 200, and perform the control for displaying the generated image as the display image related to the predetermined object 200. In such the control, the above-mentioned image generation model may be used.

Third, a case, where the user viewpoint is different from the imaging viewpoint of the predetermined object 200 and the virtual space viewpoint is the user viewpoint, will be described. As shown in FIG. 5, the user viewpoint may be a viewpoint in which the body 410 is visually recognized from the right side by approximately 30°. Since the virtual space viewpoint is the user viewpoint, the inclination of the Billboard 210 is changed so that the Billboard 210 is directly opposed to the user viewpoint. On the Billboard 210, a display image related to the predetermined object 200 is generated based on the first parameter and the second parameter (the imaged image) related to the user viewpoint (the virtual space viewpoint). In such a case, since the user viewpoint is different from the imaging viewpoint of the predetermined object 200, the display device 100 may generate an image oriented to be visually recognized from the user viewpoint (approximately 30° from the right side) based on the imaged image of the predetermined object 200, and display the generated image as the display image related to the predetermined object 200. In such the control, the above-mentioned image generation model may be used.

Figure 6:
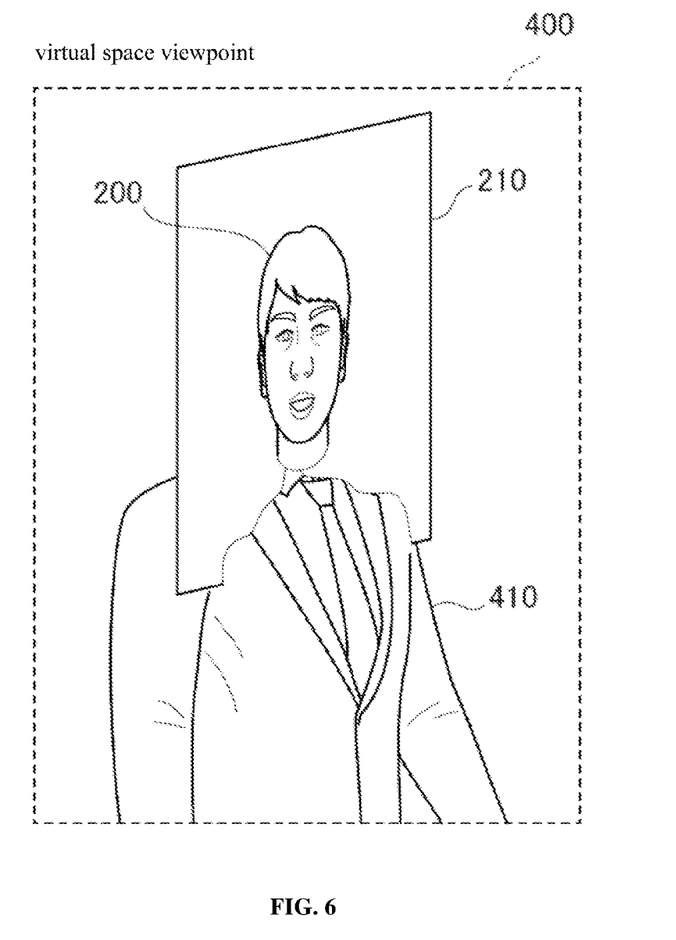
FIG. 6 is a diagram for explaining display related to an embodiment.

Fourth, from the viewpoint of describing the inclination of the Billboard 210, an image that can be visually recognized from a virtual space viewpoint different from the user viewpoint will be described. As shown in FIG. 6, when the user viewpoint is a viewpoint in which the body 410 is visually recognized from the front, the virtual space viewpoint may be a viewpoint in which the body 410 is visually recognized from the right side by approximately 30°. Since the inclination of the Billboard 210 is changed so that the Billboard 210 is directly opposed to the user viewpoint, in the virtual space viewpoint different from the user viewpoint, the inclination of the Billboard 210 is changed so that the Billboard 210 is inclined to the virtual space viewpoint different from the user viewpoint. That is, the inclination of the Billboard 210 is changed based on the relative difference between the user viewpoint and the virtual space viewpoint.

Figure 7:
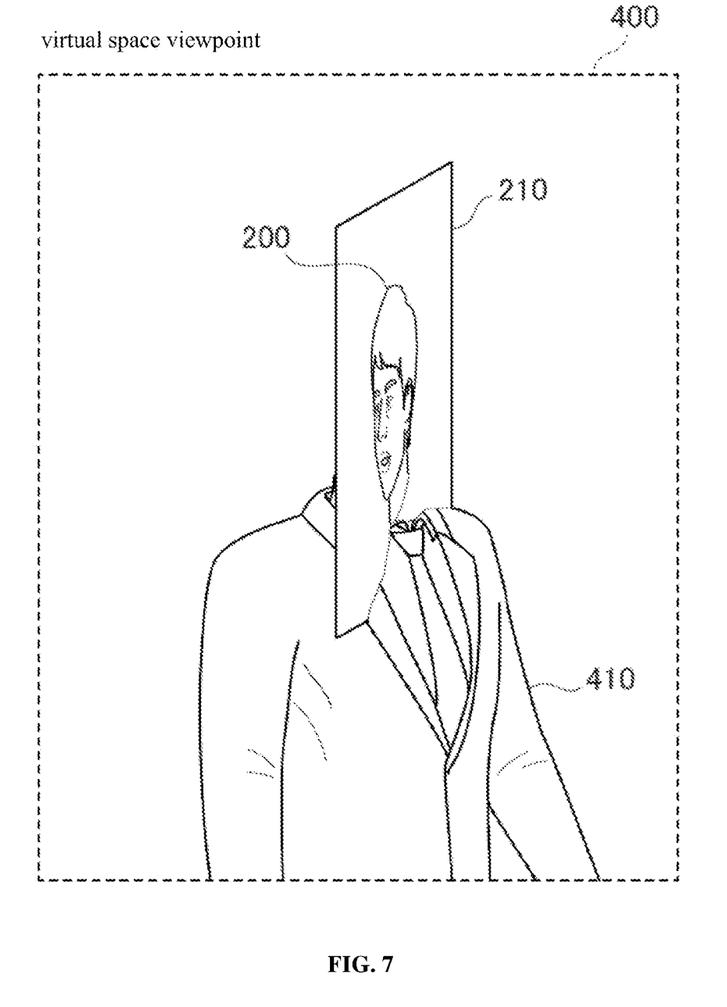
FIG. 7 is a diagram for explaining display related to an embodiment.

Fifth, from the viewpoint of describing the inclination of the Billboard 210, an image that can be visually recognized from a virtual space viewpoint different from the user viewpoint will be described. As shown in FIG. 7, when the user viewpoint is a viewpoint in which the body 410 is visually recognized from the left side by approximately 30°, the virtual space viewpoint may be a viewpoint in which the body 410 is visually recognized from the right side by approximately 30°. Since the inclination of the Billboard 210 is changed so that the Billboard 210 is directly opposed to the user viewpoint, in the virtual space viewpoint different from the user viewpoint, the inclination of the Billboard 210 is changed so that the Billboard 210 is inclined to the virtual space viewpoint different from the user viewpoint. That is, the inclination of the Billboard 210 is changed based on the relative difference between the user viewpoint and the virtual space viewpoint.

In FIGS. 3-7, the Billboard 210 is specified in the virtual space 400 for clarity of explanation, but in the Billboard 210, a portion excluding the predetermined object 200 may be transparent. That is, the image of the virtual space 400 may be displayed in the portion excluding the predetermined object 200.

A display method according to an embodiment is described below.

Figure 8:
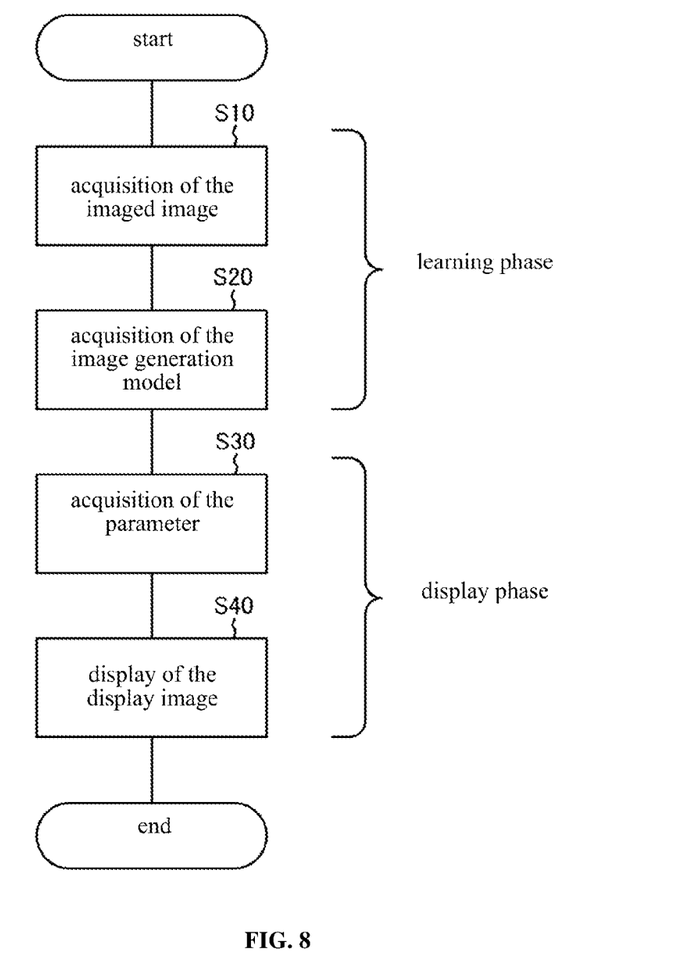
FIG. 8 is a diagram showing a display method according to an embodiment.

As shown in FIG. 8, in step S10, the display device 100 acquires an imaged image that is imaged from two or more angles and includes a changed in the predetermined object. The imaged image may be a moving image (video), or two or more still images.

In step S20, the display device 100 generates an image generation model by learning the angles and the imaged image of the predetermined object. As described above, the display device 100 may use data input by a known feature point extraction algorithms to generate an image generation model. The display device 100 may use data input by a known motion capture technology to generate the image generation model.

It is to be noted that step S10 and step S20 may be referred to as learning phases.

In step S30, the display device 100 acquires a first parameter related to a virtual space viewpoint and a second parameter defining a change in a predetermined object.

In step S40, the display device 100 changes the inclination of the Billboard in the virtual space based on the first parameter and performs a control for displaying a display image related to the predetermined object based on the first parameter and the second parameter.

It is to be noted that step S30 and step S40 may be referred to as display phases. In addition, the processing of step S30 and step S40 may be repeated in the display phases. That is, the display device 100 may sequentially change the inclination of the Billboard in the virtual space for each input of the first parameter and the second parameter, and sequentially display a display image related to the predetermined object.

In the embodiment, the display device 100 changes the inclination of the Billboard in the virtual space based on the first parameter and performs the control for displaying the display image related to the predetermined object based on the first parameter and the second parameter. That is, the display device 100 performs the control for displaying the display image on the Billboard at an angle corresponding to the inclination of the Billboard under an assumption that the display image related to the predetermined object is treated as the Billboard (2D image). By such a configuration, it is possible to artificially represent the display image related to a predetermined object as a 3D object with a simple method. Therefore, extremely specialized knowledge required for the generation of the dynamic 3D object is not required, and the calculation cost required for the generation and use of the dynamic 3D object can be greatly suppressed.

For example, assuming a case where the result of optical recognition of the predetermined object in real time is used as the second parameter, since the calculation cost required for generating and using a display image related to the predetermined object is small, the frame rate of the display image can be increased.

Although the present disclosure has been described by the disclosure described above, the statements and drawings that form part of the disclosure described above should not be understood to limit the present disclosure. Various alternative embodiments, examples and operational techniques will be apparent to those skilled in the art from this disclosure.

In the disclosure described above, a case where the second parameter is the result of optical recognition of the predetermined object in real time has been mainly described. However, the disclosure described above is not limited to this. As described above, the second parameter may be a command that specifies an operation to the predetermined object, or may be a command that specifies at least any one of time and environment defining a change in the predetermined object.

In the disclosure described above, a case where one user uses the display device 100 has been exemplified. However, the disclosure described above is not limited to this. Two or more users may use the display device 100. In such a case, the display device 100 may set a Billboard for each user directly opposed to the user viewpoint of each user based on the user viewpoint of each user, and display the display image related to the predetermined object on the Billboard. For example, when a user A and a user B exist as users using the display device 100, a Billboard for user A directly opposed to the user viewpoint of the user A may be set, and the display image related to the predetermined object may be displayed on the Billboard for user A, while a Billboard for user B directly opposed to the user viewpoint of the user B may be set, and the display image related to the predetermined object may be displayed on the Billboard for user B. In such a case, the display device 100 do not have to display the Billboard for user B and the display image related to the predetermined object to the user A, and do not have to display the Billboard for user A and the display image related to the predetermined object to the user B. Alternatively, the display device 100 may display the Billboard for user B and the display image related to the predetermined object (for example, the aspect shown in FIG. 6 and FIG. 7) to the user A based on the relative difference between the user viewpoint of the user A and the user viewpoint of the user B in a state where the Billboard for user B is inclined. Similarly, the display device 100 may display the Billboard for user A and the display image related to the predetermined object (for example, the aspect shown in FIG. 6 and FIG. 7) to the user B based on the relative difference between the user viewpoint of the user A and the user viewpoint of the user B in a state where the Billboard for user A is inclined.

In the disclosure described above, a case where the imaging viewpoint of the predetermined object is a viewpoint defined by assuming that a human face in the real world is imaged from the front has been exemplified. However, the disclosure described above is not limited to this. The imaging viewpoint of the predetermined object 200 may be a viewpoint defined by a reference viewpoint in which the predetermined object is visually recognized in the virtual space. The display image displayed on the Billboard is generated based on the relative difference between the reference viewpoint and the user viewpoint.

The display device 100 may have a display that actually displays a display image. In such a case, the control for displaying the display image related to the predetermined object as the Billboard in the virtual space may include the display of the display image on the display. The display device 100 does not have to have a display that actually displays a display image. In such a case, the control for displaying the display image related to the predetermined object as the Billboard in the virtual space does not have to include the generation of a display image and output to the display.

The display device 100 may be a cloud server provided on a network such as the Internet. In such a case, the control for displaying the display image related to the predetermined object as the Billboard in the virtual space may include an operation of outputting (transmitting) the generated display image to a terminal connected to the display device 100 via a network.

In the disclosure described above, the 2D image arranged in the virtual space is referred to as a Billboard, but the 2D image arranged in the virtual space may be referred to by other names, such as canvas.

As described above, the method of generating the image generation model is not particularly limited, but the image generation model may be generated using techniques such as CNN (Convolutional Neural Network), LSTM (Long Short-Term memory), and GAN (Generative Adversarial Network).

Although the image acquisition unit 10 is not particularly limited, it may be composed of an imaging device such as a camera, or may be composed of an image input interface connected to an imaging device. The model generation unit 20 may be composed of one or more processors. The storage unit 30 may be composed of a storage medium such as a semiconductor memory or a magnetic memory. The parameter acquisition unit 40 may be composed of an imaging device such as a camera, may be composed of an image input interface connected to an imaging device, or may be composed of a user interface for inputting a command. The display unit 50 may be composed of one or more processors that generate a display image, or may be composed of a display that actually displays the display image and the like, or may be composed of an output interface that outputs the display image and the like.

Although not particularly mentioned in the disclosure described above, a program that causes a computer to execute each processing performed by the display device 100 may be provided. In addition, the program may be recorded on a computer readable medium. When a computer readable medium is used, a program can be installed on the computer. Here, the computer readable medium on which the program is recorded may be a non-transitory recording medium. The non-transitory recording medium is not particularly restricted, and may be recording medium such as CD-ROM, DVD-ROM and the like.

Alternatively, a chip composed of a memory storing a program for executing each processing performed by the display device 100 and a processor for executing the program stored in the memory may be provided.

The invention claimed is:

1. A display device, comprising:
   a model generation unit that generates an image generation model by learning an angle of a predetermined object and a change form of the predetermined object,
   a display unit that performs a control of displaying a display image related to the predetermined object as a two-dimensional image in a virtual space; and
   a parameter acquisition unit that acquires a first parameter related to a viewpoint in the virtual space and a command specifying an operation of the predetermined object as a second parameter defining a dynamic change of the predetermined object, wherein the display unit:
     changes an inclination of the two-dimensional image in the virtual space based on the first parameter; and
     performs the control of displaying the display image related to the predetermined object with changed form as the two-dimensional image having the changed inclination, by inputting the first parameter and the second parameter to the image generation model.

2. The display device according to claim 1, comprising:
   an image acquisition unit that acquires captured images captured from two or more angles, the captured images respectively include the change form of the predetermined object; wherein
   the model generation unit generates the image generation model by using the captured image.

3. A display method, comprising:
   a step A of generating an image generation model by learning an angle of a predetermined object and a change form of the predetermined object,
   a step B of performing a control of displaying a display image related to the predetermined object as a two-dimensional image in a virtual space; and
   a step C of acquiring a first parameter related to a viewpoint in the virtual space and a command specifying an operation of the predetermined object as a second parameter defining a dynamic change of the predetermined object, wherein
   the step B comprising
     changing an inclination of the two-dimensional image in the virtual space based on the first parameter, and
     performing the control of displaying the display image related to the predetermined object with changed form as the two-dimensional image having the changed inclination, by inputting the first parameter and the second parameter to the image generation model.

* * * * *